(12) United States Patent
Mainberger

(10) Patent No.: US 6,194,863 B1
(45) Date of Patent: Feb. 27, 2001

(54) METHOD AND APPARATUS FOR DRIVING A STEPPING MOTOR

(75) Inventor: Robert Mainberger, Braunfels (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/369,268

(22) Filed: Aug. 6, 1999

Related U.S. Application Data

(63) Continuation of application No. PCT/DE98/00053, filed on Jan. 9, 1998.

(30) Foreign Application Priority Data

Feb. 6, 1997 (DE) ............................................... 197 04 296

(51) Int. Cl.[7] ...................................................... H02P 8/00
(52) U.S. Cl. .......................... 318/696; 318/685; 318/602; 318/605; 318/661
(58) Field of Search .................................... 318/696, 685, 318/602, 605, 661

(56) References Cited

U.S. PATENT DOCUMENTS

| | | | | |
|---|---|---|---|---|
| 4,584,512 | * | 4/1986 | Pritchard | 318/696 |
| 5,008,607 | * | 4/1991 | Ono et al. | 318/696 |
| 5,055,761 | * | 10/1991 | Mills | 318/696 |
| 5,198,741 | * | 3/1993 | Shinada et al. | 318/696 |
| 5,942,872 | * | 8/1999 | Steger et al. | 318/696 |
| 6,016,044 | * | 1/2000 | Holdaway | 318/696 |

FOREIGN PATENT DOCUMENTS

89/07859    8/1989  (WO) .

OTHER PUBLICATIONS

H. Moczala et al., "Expert–Verlag", *Elektrische Kleinmotoren* [*Low–power electric motors*], pp. 278–281 (1993).
Patent Abstract of Japan, "Digital–Analog Voltage Converting Circuit", Patent Abstract of Kusumoto Satoshi, Japan 06/334528, (Feb. 12, 1994).
H. Moczala et al., "Expert–Verlag", *Elektrische Kleinmotoren* [*Low–power electric motors*], pp. 261–263, (1993).
F. Prautzsch, "Franzis–Verlag", *Schrittmotorantriebe* [*Stepping motor devices*], pp. 70–76, (1988).

* cited by examiner

Primary Examiner—Robert E. Nappi
Assistant Examiner—Edgardo San Martin
(74) Attorney, Agent, or Firm—Foley & Lardner

(57) ABSTRACT

A method and an apparatus for driving a stepping motor is provided. Digital desired current values are stored in the form of a sine table and are read from the sine table at a constant sampling frequency. The intervals between the read-out table values can be varied equally and unequally. The digital desired current values are converted into discrete analog signals. A sinusoidal signal is reconstructed from the analog signals. A motor current for exciting a phase of the stepping motor is derived from the sinusoidal signal.

28 Claims, 2 Drawing Sheets

METHOD AND APPARATUS FOR DRIVING A STEPPING MOTOR

Figure 1A:
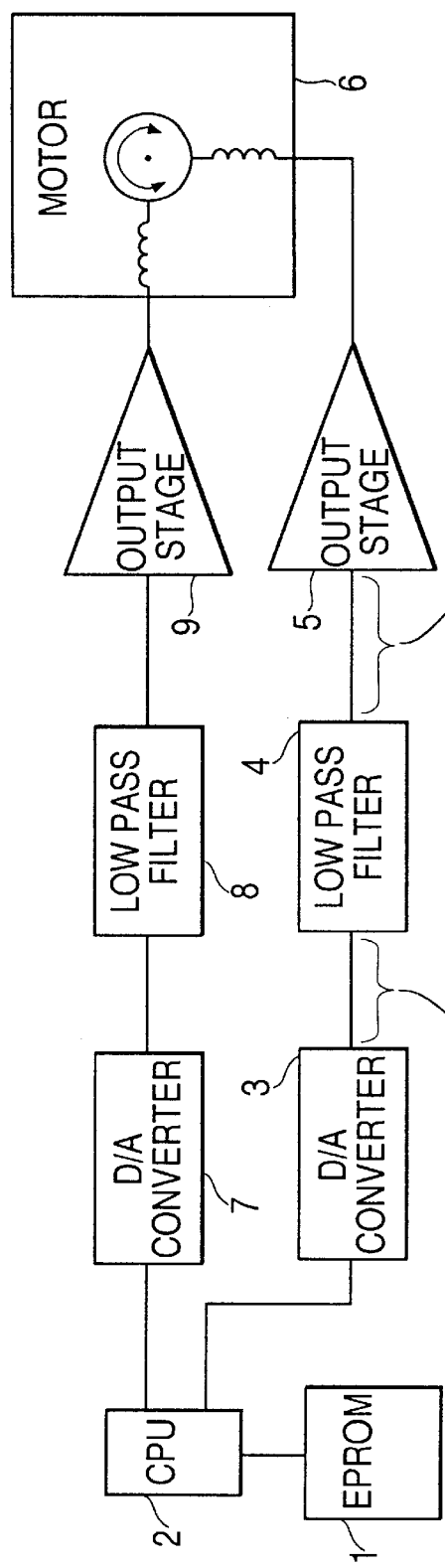

This application is a continuation of PCT/DE98/00053 filed Jan. 9, 1998.

The benefit is hereby claimed of the right to an earlier effective filing date based on PCT/DE98/00053 (filed Jan. 9, 1998 and entitled "Method and Device for Controlling A Stepping Motor") as provided for in 35 U.S.C. § 120. The contents of PCT/DE98/00053, filed Jan. 9, 1998, and German priority application DE 197 04 296. 1, filed Feb. 6, 1997, are hereby incorporated by reference. The invention relates to a method and an apparatus for performing the method for driving a stepping motor.

BACKGROUND OF THE INVENTION

Stepping motors are used nowadays in diverse applications for positioning in technical equipment. They allow accurately stepped positioning without position feedback. If high positioning accuracy is required, it is necessary, as a rule, to operate the stepping motors in microstepping operation. In this case, the user makes high demands on the true running and on the low degree of vibration of the motor even in the case of high traversing speeds which are necessary in order to rapidly reach more remote positions.

The use of stepping motors in microstepping operation is described for example in "Elektrische Kleinmotoren" [Low-power electric motors] by H. Moczala et al., Expert-Verlag, 1993, pages 261–263, and "Schrittmotorantriebe" [Stepping motor drives] by F. Prautzsch, Franzis-Verlag, 1988, pages 70–76. The principles shall be briefly explained below.

Microstepping operation is understood to mean the supply of the stepping motor with sinusoidally stepped motor currents instead of motor currents with rectangular block waveforms in full- and half-step operation. The values of the stepped motor currents are present as desired current values in a stored sine table. The individual, successive table values are read out one after the other by the motor controller and the motor currents are generated from these. In this case, a temporally limited motor current value of a specific level corresponds to each table value. A new motor current value per phase in each case causes the motor to move further by one microstep. The sine table is constructed in such a way that read-out of the successive table locations always gives a fixed step size.

The number of full steps of a stepping motor is governed by the design. A complete sine period of the motor current corresponds to a rotation of the stepping motor by four full steps. Therefore, the number of table locations for a full sine period corresponds to the number of microsteps allotted to four full steps. The number of table locations per sine period therefore determines the step size of the microsteps and hence the positional resolution of the stepping motor.

The rotational speed of the motor is set by increasing or reducing the stepping frequency, in other words by changing the time intervals between the steps. The stepping frequency required for a desired rotational speed of the stepping motor is calculated from the product of "number of full steps of the stepping motor times number of microsteps times number of desired revolutions per second".

In the known stepping motor drives, the sine table containing the digital desired current values for the motor current is stored in a memory, for example an EPROM. If the stepping motor is intended to move to a specific target position, a CPU calculates the microstep sequence, necessary for reaching the target position, with in each case constant step sizes in the form of a sequence of sinusoidally stepped motor current values and the required stepping frequency for the desired rotational speed.

In accordance with the length of the sequence of microsteps that has been previously calculated by the CPU, the digital desired current values necessary for this purpose are read from successive table locations of the sine table at the stepping frequency calculated by the CPU.

The digital desired current values for the motor currents that are read out are converted by a D/A converter into analog desired current values, which appear as stepped analog signals with an approximately sinusoidal basic form at the output of the D/A converter. The motor current (actual value) is generated as a temporal sequence of stepped motor current values from the output signals of the D/A converter in an output stage. In a manner corresponding to the digital desired current values read from the sine table, these generated motor current values are stepped with a staircase waveform, corresponding approximately to a sine curve. In the same way, the correspondingly phase-shifted motor current value is generated for each of the phases of the stepping motor for each microstep. The stepping motor executes one microstep for each new motor current value per phase.

The number of sinusoidally stepped motor current values that are calculated up to a target position corresponds to the number of microsteps necessary for reaching the motor target position. The target position reached in each case lies at the end of a microstep. The possible resolution of the target position is given by the size of the microsteps and hence by the number of table locations of the sine table. If the intention is to move to positions between two microsteps, this is not possible with the sine table given. An increase in the resolution of the target position can only be achieved by a more finely divided sine table and thus by a higher number of smaller microsteps. This requires the CPU to calculate a longer step sequence. For different positional resolutions, therefore, it is necessary to store differently finely divided sine tables in memories. An increase in the rotational speed of the stepping motor is possible only by means of an even higher stepping frequency. This also additionally requires higher CPU capacities.

The known controllers have the disadvantages of the very high stepping frequencies that are necessary given a high resolution and, at the same time, high rotational speed of the stepping motor, and the large CPU capacity that is necessary as a result of this, because the CPU generates the stepping frequencies and calculates the step sequences. Furthermore, accelerated movements additionally require continuous variation of the stepping frequency. Low accelerations and high rotational speeds in microstepping operation require, at relatively high resolutions, very long step sequences and extremely fast changes in the time between the steps, these changes no longer being technically feasible. Therefore, high rotational speeds of the stepping motor are possible only with reduced positional resolution, that is to say additionally stored smaller sine tables with fewer table values. However, a reduction in the positioning resolution and hence lower frequencies lead to disturbingly loud motor running and vibrations. A high CPU capacity is likewise necessary in order to calculate the sequences of motor current values that are necessary for generating acceleration or deceleration profiles. As an alternative, a certain number of acceleration profiles could be calculated prior to operation and be stored in a memory. On account of the limited memory space, this restricts the traversing operation to this small number of stored acceleration profiles.

SUMMARY OF THE INVENTION

The object of the present invention, therefore, is to specify a method and an apparatus for performing the method for driving a stepping motor which operates at low frequencies and with a small CPU capacity in conjunction with the highest possible resolution and very good true running. Furthermore, the intention is to be able to set a large number of acceleration profiles and speeds in conjunction with a small CPU capacity.

This object is achieved according to the invention by means of the features specified herein.

The method according to the invention does not operate with a variable stepping frequency and a fixed step size but rather with an always constant stepping frequency but variable step size. According to the invention, at least three arbitrarily selected desired current values are read from a sine table, which is stored in an EPROM and contains the digital desired current values for the motor current, at an always constant sampling frequency per sine period of the sine table. A smooth, sinusoidal profile of the desired current values for the motor current is reconstructed from these desired current values having arbitrary sudden value changes by low-pass filtering and a sinusoidal motor current is generated from this.

In contrast to the known methods, the successive digital desired current values are not read from the sine table, rather the digital desired current values to be read out are selected in accordance with the desired traveling behavior of the motor. Since successive table locations determine the size of a microstep, each table location of the sine table is also assigned a specific motor position. The step size is therefore varied by the selection of the table locations that are read. Since the selected digital desired current values are all read out at an always constant sampling frequency, that is to say at identical time intervals, this variation of the step size also results in the rotational speed of the stepping motor being varied at the same time. The constant sampling frequency means that a higher rotational speed is inevitably produced for large step sizes than for small step sizes.

Different constant rotational speeds of the stepping motor are generated by each nth value being read from the sine table at a constant sampling frequency, where n is an integer. For n=1, each desired current value of the sine table is read out and, as a result, the lowest frequency of the generated sinusoidal motor current, that is to say the lowest rotational speed of the stepping motor, is set. For n=2, every second desired current value is read from the sine table. Since the step size in the sine table is doubled at a constant sampling frequency, the frequency of the generated sinusoidal motor current is thus also twice as large for the case n=1. As a result, the rotational speed of the stepping motor is also twice as large.

The number n consequently constitutes a temporal compression factor for the sine table that is read and hence the setting variable for the frequencies of the sinusoidal motor currents that are generated. The greater the number n and thus the step size between the table locations of the sine table that are read, the higher the frequencies of the sinusoidal motor currents that are generated, and the more rapidly the stepping motor rotates. As long as the step size is set to be constant, the rotational speed of the stepping motor is also constant.

Accelerations and decelerations can be realized by increasing or reducing the step size in the sine table in a step-by-step manner. In order to set an accelerated movement of the motor, therefore, selected digital desired current values are read from the sine table with a constant sampling time, the spacings between the table locations of the sine table that are read continually increasing. In order to set a decelerated movement of the motor, selected digital desired current values are read from the sine table with a constant sampling time, the spacings between the table locations of the sine table that are read continuously decreasing.

Given a sufficiently high CPU capacity, the required digital desired current values for the sine signal could also be calculated continuously by the CPU instead of being read from the EPROM. In accordance with the object, however, a stepping motor controller with a low CPU capacity is specified here.

A CPU is used for positional and rotational speed control of the stepping motor. For a desired target position of the stepping motor, the CPU calculates a sequence of intermediate positions that are to be moved to one after the other in order to reach the target position. The step size can be varied as desired for this purpose. It is given by the spacings between the table locations to be read in the sine table. Owing to the constant sampling frequency, the stepping motor rotates at high speed for large steps and at low speed for small steps.

For each intermediate position that is calculated, the digital desired current value to be read from the sine table is determined for each phase of the motor by the CPU. The associated digital desired current values are then read from the sine table at a constant sampling frequency by CPU one after the other in accordance with the sequence of intermediate positions calculated by the CPU.

The digital desired current values read out by the CPU are then converted into analog values and a smooth sinusoidal profile of the desired current values is reconstructed from these using a low-pass filter, the motor currents for exciting the phases of the stepping motor being derived from the profile.

In one embodiment, the digital desired current values read from the sine table are passed to a D/A converter. Stepped analog desired current values appear at the output of the D/A converter. Their basic form is approximately sinusoidal for low rotational speeds, that is to say for small step sizes. For high rotational speeds, that is to say for large step sizes, the stepped analog desired current values have large sudden amplitude changes and no similarity at all to a sine. All the stepped desired current values appear at the constant sampling frequency. These can be reconstructed with just one analog low-pass filter, which is specifically tuned to the sampling frequency, under specific preconditions, given here, to form the smooth sinusoidal waveform.

Specifically, since the sampling frequency is constant, the sampling theorem is applicable (in this respect, see the usual mathematics textbooks or else "Elektrische Kleinmotoren" [Low-power electric motors] by H. Moczala et al., Expert-Verlag, 1993, pages 278–281). Accordingly, time-variable signals can be completely reconstructed from the sampled values, after sampling at a constant sampling frequency, if the sampling frequency has at least twice the value of the highest frequency to be reconstructed.

For the method according to the invention this means that the sampling frequency must be chosen to be more than twice as large as the largest sine frequency to be generated, which corresponds to the largest rotational speed that can be set for the stepping motor in full-step operation. This is, in that case, the sampling frequency at which the motor moves at maximum speed with only four instances of sampling per period of the sine table. All other, that is to say lower, traversing speeds are then also possible with the same low sampling frequency, namely by sampling more than four desired values per sine period.

It follows from this that, in the course of a complete sine period, at least three samples from the sine table are necessary as reference points for the filter so that the sine curve can be completely reconstructed. In full-step operation of a two-phase stepping motor, that is to say with four steps for a full sine period, however, there are already four reference points present because the sine table in the EPROM is sampled at four locations. As a result, the requirement of the sampling theorem is always fulfilled even in full-step operation. The requirement is then fulfilled in any event for microstepping operation with correspondingly more instances of sampling.

A suitable low-pass filter is used in order to reconstruct a sinusoidal profile of the desired current values for driving the stepping motor. This low-pass filter reconstructs a smooth sine curve from the stepped analog desired current values. The low-pass filter has to filter out all frequencies which do not correspond to the sine frequency to be generated. For this purpose, the cut-off frequency of the low-pass filter must be chosen to be less than half the sampling frequency of the CPU. In order to simplify the low-pass filter, it is possible to operate with a higher constant sampling frequency than the lowest possible one. A smooth sinusoidal signal of the desired current values then appears at the output of the low-pass filter and is passed to the input of an output stage which generates the motor current from this.

In another embodiment, the digital desired current values read from the sine table are passed to a pulse width modulator instead of to a D/A converter. This pulse width modulator generates a high-frequency pulse train at a constant pulse width modulation frequency, abbreviated to PWM frequency below, at its output for each incoming digital desired current value from the sine table. The analog average value of this generated pulse train is in each case proportional to the level of the input signal.

The high-frequency pulse trains generated by the pulse width modulator are passed to the input of a low-pass filter. The constant PWM frequency of the pulse trains generated by the pulse width modulator must be greater than the sampling frequency of the CPU, but at the very least equal to it, and thus more than twice as large as the cut-off frequency of the low-pass filter. For each incoming high-frequency pulse train, the low-pass filter forms the analog average value and, at the same time, filters out both the PWM frequency and the sampling frequency. The low-pass filter thus directly reconstructs a smooth analog sinusoidal signal for the desired current values in accordance with the desired current values read out by the CPU. Therefore, a smooth sinusoidal signal of the desired current values appears at the output of the low-pass filter and is passed to the input of an output stage.

For each phase of the stepping motor, the correspondingly phase-shifted, actually sinusoidal profiles of the desired current values are generated from the read-out desired current values of the sine table in one of the ways described, that is to say either by a combination of D/A converter with downstream low-pass filter or by a combination of pulse width modulator with downstream low-pass filter, and are passed to a respective output stage. The outputs of the output stages supply the phase-shifted, sinusoidal motor currents.

With previously known drives, a stepping motor moves to its desired position in small jerky steps in accordance with the sinusoidally stepped motor current values. In the event of high traversing speeds and at the same time a reduced positional accuracy, that is to say larger steps, operation with previously known drives leads to disturbingly loud operational noises from the motor and disturbing vibrations. By contrast, a stepping motor with a drive according to the method of the invention moves to its desired position without any jumps and thus quietly and with little vibration on account of the actually sinusoidal motor currents.

The method is suitable for positioning operation for all stepping motors having permanent-magnetic excitation, in other words including for hybrid stepping motors and linear stepping drives, as well as generally for all motors having at least two coils and phase-offset motor currents, such as synchronous motors for example. The method can likewise be applied to polyphase stepping motors in that, by way of example, the required digital desired current values with the necessary phase shift are read out for each phase from the sine table and the phase-shifted motor currents required for the different phases of the motor are generated from these according to the invention. With a powerful CPU, it is also possible for the digital desired current values of the sine table to be calculated continuously instead of being taken from a sine table.

In contrast to previously known stepping motor controllers in microstepping operation, the method according to the invention always operates at the same low sampling frequency for all speeds and all instances of fine positioning. Therefore, with the novel method, given a constant sampling frequency, the positional resolution can be increased as desired, even with a constant maximum speed, merely by the specification of a single sine table that is as finely divided as possible. Since, according to the invention, a single finely divided sine table suffices for setting all the step sizes, the storage capacity, required in the case of the previously known method, for storing diverse sine tables for different step sizes is also obviated.

The novel method is distinguished by a very large number of possible speeds and acceleration profiles with positional resolution that is as high as desired, in conjunction with optimized true running. Thus, the novel method is distinctly superior to the previous stepping motor drives since high speeds could only be achieved with a reduction of the positional resolution or by increasing the stepping frequency, with the disadvantages already explained, in the case of the previous motor drives.

The magnitude of the constant sampling frequency determines the number of arithmetic operations of the CPU per unit time and thus influences the required CPU capacity. Since the method according to the invention operates at the same low, constant sampling frequency for all speeds and resolutions, only the same small CPU capacity is ever required as well.

The invention is explained in more detail using two exemplary embodiments with the aid of the schematic drawings.

BRIEF DESCRIPTION OF THE ATTACHED DRAWINGS

Figure 1C:
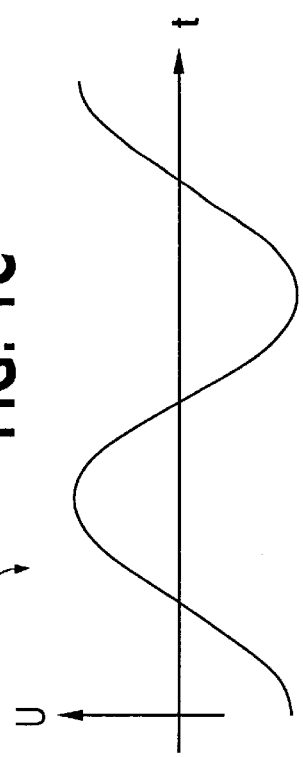
Figure 1B:
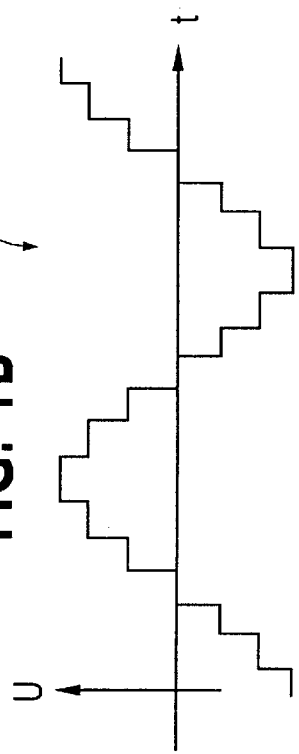
Figure 2A:
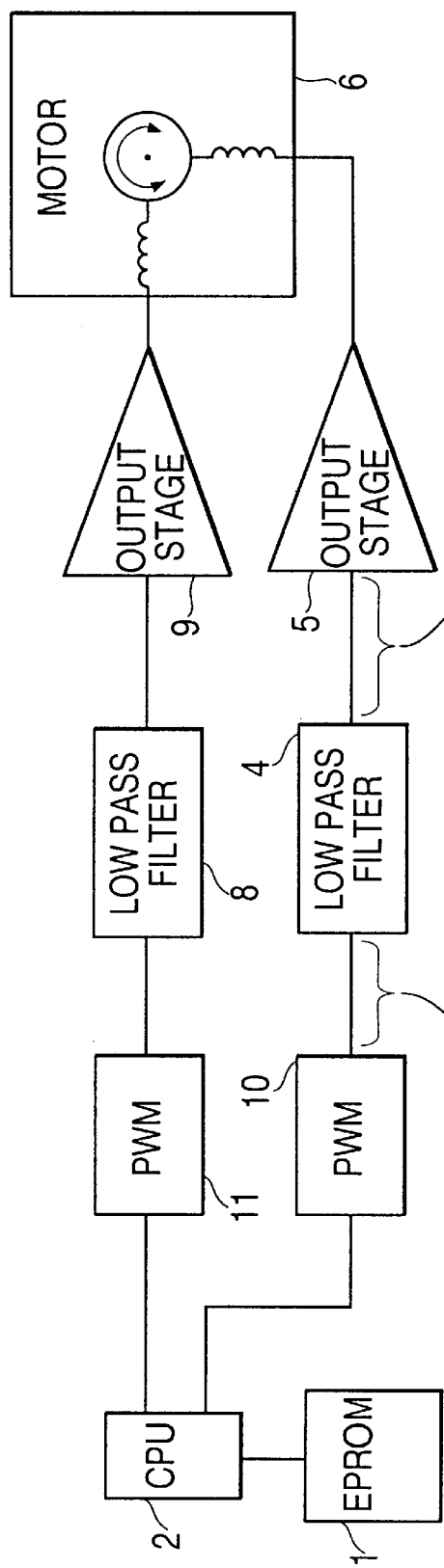
Figure 2C:
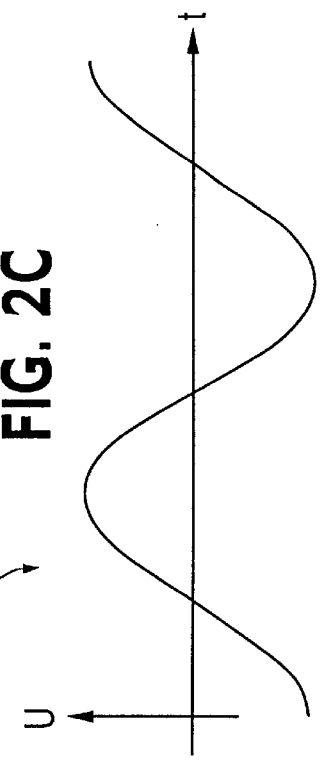
Figure 2B:
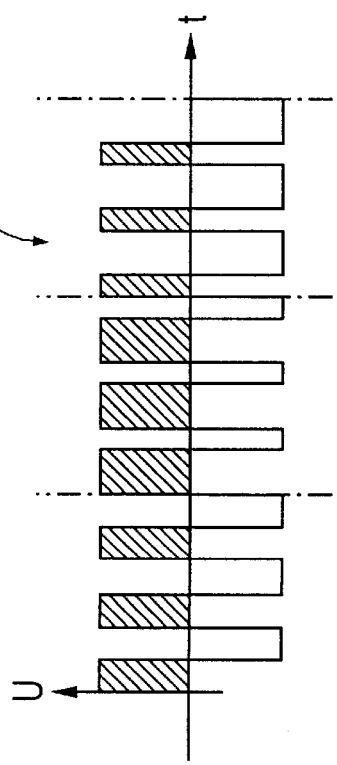

FIGS. 1A–1C show circuit diagrams of a first apparatus according to the invention with digital-to-analog conversion by a D/A converter; and FIGS. 2A–2C show circuit diagrams of a second apparatus according to the invention with digital-to-analog conversion by a pulse width modulator.

DETAILED DESCRIPTION OF THE INVENTION

Referring to FIGS. 1A–1C, a sine table containing the digital desired current values for the motor currents to be generated is stored in an EPROM 1. The number of table locations t determines the possible positional resolution of the motor. A CPU 2 reads current values from the table at intervals. The distances, or intervals, between current values can be varied equally or unequally and amount to no more than (t/2−1). The intervals are varied depending on the desired movement of the stepper motor. In one embodiment, the CPU 2 reads at least three selected, digital desired current values from the sine table in the EPROM 1 at a constant sampling frequency $f_A$ per sine period.

In the present example, it is assumed for the purpose of simplification, that a constant rotational speed is intended to be set for the motor. For this purpose, the digital desired current values are read from the sine table with uniform spacings, or intervals, between the table locations to be read from the sine table. In the present example, it is assumed that the sine table is read with a large step size. As a result, the frequency of the motor current to be generated will be high, and the rotational speed of the stepping motor will thus be high as well.

The digital desired current values read from the sine table by the CPU 2 are passed to a D/A converter 3. Stepped, analog desired current values appear at the output of the D/A converter 3, the values being schematically illustrated separately in FIG. 1B. In the case illustrated, the values have an approximately sinusoidal profile. Since only few instances of sampling are formed per period of the sine, the analog output signals of the D/A converter 3 have very large step changes.

They are passed to the input of a low-pass filter 4, at the output of which appears the completely reconstructed genuine sinusoidal signal of the desired current values which is illustrated separately in FIG. 1C. This smooth sinusoidal signal is passed to an output stage 5, which generates from this the sinusoidal motor current for the first phase of a two-phase stepping motor 6.

For the second phase of the stepping motor 6, the motor current is likewise generated according to the method of the invention in the manner already described. For this purpose, the CPU 2 reads selected digital desired current values for the motor current of the second phase of the stepping motor 6 from the EPROM 1. For this purpose, the digital desired current values are read from the sine table in a manner phase-offset by ninety degrees relative to those for the first phase of the stepping motor 6. The digital desired current values that are read out are passed to a D/A converter 7, at the output of which appear stepped, analog desired current values which are phase-shifted through ninety degrees relative to those appearing after the D/A converter 3.

The output signals of the D/A converter 7 are passed to the input of a low-pass filter 8, at the output of which a completely reconstructed sinusoidal signal appears. This signal is phase-shifted through ninety degrees relative to that appearing after the low-pass filter 4. The output signal of the low-pass filter 8 is passed to the input of an output stage 9, which generates the sinusoidal motor current for the second phase of the stepping motor 6.

As long as the two phases of the stepping motor 6 are supplied with the sinusoidal, phase-shifted motor currents generated, the stepping motor 6 rotates at a constant speed. The end position of the stepping motor 6 is determined by the last two digital desired current values, phase-offset by ninety degrees, in the sine table, which values are read out by the CPU 2 and are also processed to form motor currents for the two phases. The motor thus rotates to its end position.

As long as no sinusoidal, phase-shifted motor currents are fed to the stepping motor 6, in other words as long as no further digital desired current values are read from the sine table by the CPU 2, the motor remains at a standstill. Only as a result of the read-out of further digital desired current values phase-offset by ninety degrees are sinusoidal, phase-shifted motor currents again generated and the stepping motor 6 is caused to move again.

In FIGS. 2A–2C, by comparison with FIGS. 1A–1C, the D/A converters 3, 7 are replaced by the pulse width modulators 10, 11. This embodiment is particularly advantageous because the pulse width modulators are already contained in many commercially available CPU modules. This saves costs and circuitry. A CPU 2 reads selected digital desired current values from the sine table stored in an EPROM 1 at a constant sampling frequency fA. In this case, too, the condition whereby at least three selected digital desired current values are read from the sine table per sine period must be met in order to fulfill the sampling theorem. These values are passed to the input of the pulse width modulator 10.

The latter converts the digital desired current values into high-frequency pulse trains at a constant PWM frequency $f_{PWM}$. The analog average value of the pulse train at the output of the pulse width modulator 10 is in each case proportional to the level of its digital input signal. That means, for example, that a digital input signal equal to zero generates, at the output of the pulse width modulator 10, a pulse train whose average value is also equal to zero on the basis of the pulse widths of the individual pulses. For a digital input signal greater than zero, the positive components of the pulses of the output signal become wider in such a way that the average value of the new pulse train is greater than zero and proportional to the level of the input signal. For a digital input signal less than zero, the positive components of the pulses of the output signal become narrower in such a way that the average value of the new pulse train is less than zero and proportional to the level of the input signal. The pulse train appearing at the output of the pulse width modulator 10 for very large step sizes is schematically illustrated separately in FIG. 2B.

The high-frequency pulse trains generated by the pulse width modulator 10 are passed to the input of a low-pass filter 4. The PWM frequency $f_{PWM}$ of the pulse trains generated by the pulse width modulator 10 is greater than or equal to the sampling frequency $f_A$ of the CPU 2 or greater and thus more than twice as high as the cut-off frequency of the low-pass filter 4, wherein $f_{PWM} \geq f_A > 2\ f_{limit}$. For each incoming high-frequency pulse train, the low-pass filter 4 forms the analog average value and at the same time filters out both the PWM frequency of the pulse width modulator 10 and the sampling frequency of the CPU 2. All frequencies which do not correspond to the sinusoidal signal to be reproduced are thus filtered out. As a result, the low-pass filter 4 supplies a complete, smooth sinusoidal signal of the desired current values at its output. The completely reconstructed, smooth sinusoidal signal appearing at the output of the low-pass filter 4 is illustrated separately in FIG. 2C. This smooth sinusoidal signal is passed to the input of an output stage 5, which generates from this the motor current for the first phase of a stepping motor 6.

The motor current for the second phase of the stepping motor 6 is generated in a corresponding manner. For this purpose, selected digital desired current values are read from the EPROM 1 by the CPU 2 at a constant sampling frequency and passed to the input of the pulse width modulator 11. For this purpose, the digital desired current values are read from the sine table in a manner phase-offset by ninety degrees relative to those for the first phase of the stepping motor 6.

For each incoming digital desired current value, the pulse width modulator 11 supplies, at its output, a high-frequency pulse train with an analog average value proportional to the input signal. The pulse trains generated by the pulse width modulator 11 are passed to the input of a low-pass filter 8. The latter reconstructs, as already described above in the case of the low-pass filter 4, a complete smooth sinusoidal signal of the desired current values from the incoming pulse trains. The reconstructed sinusoidal signal appearing at the output of the low-pass filter 8 is phase-shifted through 90 degrees relative to the reconstructed sinusoidal signal, illustrated separately in FIG. 2C, after the low-pass filter 4. The sinusoidal signal at the output of the low-pass filter 8 is passed to the input of an output stage 9, which generates from this the sinusoidal motor current for the second phase of the stepping motor 6.

In this example, too, the stepping motor 6 moves as long as its two phases are supplied with sinusoidal, phase-shifted motor currents. The end position moved to by the stepping motor 6 is likewise determined by the last two digital desired current values which are read from the sine table and converted into motor currents.

What is claimed is:

1. A method for controlling a stepper motor in which digital set current values are stored in the form of a sine table with a number t of table places and are read out of this sine table, and in which a motor current is derived from the read-out digital set current values for the excitation of a phase of the stepper motor, the method comprising:

selecting at a constant scanning frequency $f_A$ digital set current values out of said table places of said sine table, wherein the intervals between the read-out table places can be varied to be any interval from every table place up to every (t/2–1)-th table place;

converting every read-out digital set current value to a discrete analog signal;

suppressing, by means of a low-pass filter with a frequency limit flimit<½$f_A$, all frequencies outside of the spectrum of all reconstructable sine frequencies; and reconstructing a sine signal from which the motor current for the excitation of a phase of the stepper motor is derived.

2. A method according to claim 1, wherein the read-out digital set current values are converted by a D/A converter into discrete analog signals.

3. A method according to claim 1, wherein that the read-out digital set current values are modulated for conversion to discrete analog signals with a pulse width modulator with a modulation frequency $f_{PWM}$, wherein $f_{PWM} \geq f_A > 2\ f_{limit}$.

4. A method according to claim 1, wherein the speed of the stepper motor is set by reading out digital set current values at equal intervals from the sine table.

5. A method according to claim 2, wherein the speed of the stepper motor is set by reading out digital set current values at equal intervals from the sine table.

6. A method according to claim 3, wherein the speed of the stepper motor is set by reading out digital set current values at equal intervals from the sine table.

7. A method according to claim 1, wherein aerated movement of the stepper motor is set by reading out digital set current values at progressively increasing intervals of the sine table places.

8. A method according to claim 2, wherein accelerated movement of the stepper motor is set by reading out digital set current values at progressively increasing intervals of the sine table places.

9. A method according to claim 3, wherein accelerated movement of the stepper motor is set by reading out digital set current values at progressively increasing intervals of the sine table places.

10. A method according claim 1, wherein retarded movement of the stepper motor is set by reading out digital set current values with progressively decreasing intervals of the sine table places.

11. A method according claim 2, wherein retarded movement of the stepper motor is set by reading out digital set current values with progressively decreasing intervals of the sine table places.

12. A method according claim 3, wherein retarded movement of the stepper motor is set by reading out digital set current values with progressively decreasing intervals of the sine table places.

13. A method according to claim 1, wherein the selected digital set current values are progressively computed and temporarily stored.

14. A method according to claim 2, wherein the selected digital set current values are progressively computed and temporarily stored.

15. A method according to claim 3, wherein the selected digital set current values are progressively computed and temporarily stored.

16. A method according to claim 4, wherein the selected digital set current values are progressively computed and temporarily stored.

17. A method according to claim 5, wherein the selected digital set current values are progressively computed and temporarily stored.

18. A method according to claim 6, wherein the selected digital set current values are progressively computed and temporarily stored.

19. A method according to claim 7, wherein the selected digital set current values are progressively computed and temporarily stored.

20. A method according to claim 8, wherein the selected digital set current values are progressively computed and temporarily stored.

21. A method according to claim 9, wherein the selected digital set current values are progressively computed and temporarily stored.

22. A method according to claim 10, wherein the selected digital set current values are progressively computed and temporarily stored.

23. A method according to claim 11, wherein the selected digital set current values are progressively computed and temporarily stored.

24. A method according to claim 12, wherein the selected digital set current values are progressively computed and temporarily stored.

25. An apparatus for controlling a stepper motor comprising:

a digital sine table for the storage of digital set current values with a number t of table places;

a CPU for scanning with a constant scanning frequency $f_A$ digital set current values from said digital sine table;

an electronic converter for converting said scanned digital set current values from selected table places to discrete analog set current values, wherein said electronic converter converts said current values selected at any interval from every table place up to every (t/2–1)-th table place;

a low-pass filter connected to an output of said electronic converter with a limit frequency flimit<$f_A$/2 and for reconstruction of a sine signal; and an end stage connected to an output of said low-pass filter for producing a motor current for a phase of the stepper motor.

26. An apparatus according to claim 25, wherein said electronic converter is a D/A converter.

27. An apparatus according to claim 25, wherein said electronic converter is a pulse-width modulator with a PWM frequency $f_{PWM} \geq$ the scanning frequency $f_A$.

28. A method for driving a stepping motor wherein digital desired current values are stored in the form of a sine table having t places and are read from said sine table, a motor current for exciting a phase of the stepping motor being derived from said read digital desired current values, the method comprising:

selecting digital desired current values from table locations of said sine table at a constant sampling frequency $f_A$;

varying a step size between said selected digital desired current values in a manner dependent on a desired traveling behavior of said stepping motor, wherein the step size varies from every table place up to every (t/2–1)-th table place;

converting each of said selected digital desired current values into discrete analog signals; and reconstructing a sinusoidal signal from said discrete analog signals by means of a low-pass filter with a frequency limit flimit<½$f_A$, whereby motor current for exciting a phase of the stepping motor is derived from said sinusoidal signal.

\* \* \* \* \*